Oct. 12, 1948.  H. R. SCHUTZ  2,450,995
APPARATUS FOR FORMING HOLLOW GLASSWARE
Filed Aug. 14, 1943  2 Sheets-Sheet 1

Inventor
H. R. SCHUTZ
Rule and Hoge
Attorneys

Oct. 12, 1948.　　　H. R. SCHUTZ　　　2,450,995
APPARATUS FOR FORMING HOLLOW GLASSWARE
Filed Aug. 14, 1943　　　2 Sheets-Sheet 2
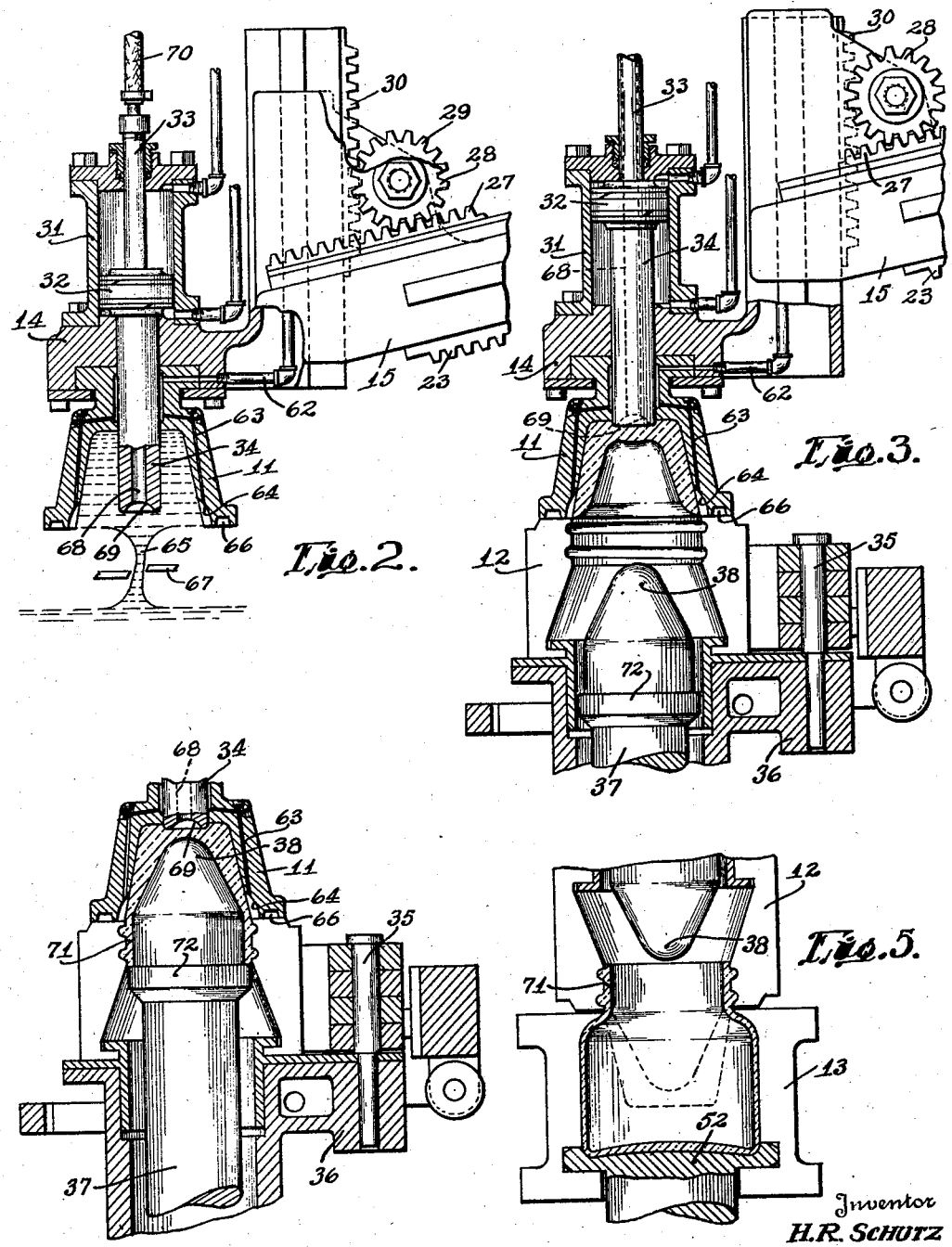

Patented Oct. 12, 1948

2,450,995

UNITED STATES PATENT OFFICE 2,450,995

APPARATUS FOR FORMING HOLLOW GLASSWARE

Harold R. Schutz, Toledo, Ohio, assignor, by mesne assignments, to Owens-Illinois Glass Company, Toledo, Ohio, a corporation of Ohio Application August 14, 1943, Serial No. 498,639

5 Claims. (Cl. 49—5)

My invention relates to apparatus adapted for use in the manufacture of hollow glassware including bottles, jars, tumblers, and various other glass articles. In its preferred form the invention provides a glass molding machine of the suction gathering type wherein a charge of glass is gathered by suction into a blank mold, and comprises novel means by which the gathered charge is reshaped into a hollow parison or blank within the mold. The hollow blank is then subjected to a press molding operation within the blank mold and a neck mold which has been brought into register therewith. The blank mold is then separated from the formed parison, leaving the latter suspended from the neck mold. A finishing mold is then brought into register with the neck mold and closed around the parison, which is then blown to its final form within the combined neck and finishing mold.

An object of the invention is to provide a novel apparatus by which a charge of glass may be given a hollow form within the suction gathering mold, of a desired shape for the final blowing operation and adapted for obtaining a blown article in which the glass is uniformly distributed and free from the usual defects.

A further object of the invention is to provide a novel apparatus for gathering a charge of glass by suction into a blank mold and after the glass is within the mold, giving it a hollow conformation by a suction operation.

The invention further provides means for shaping the hollow blank by a pressing operation within the gathering mold, before the blank is blown to its final form. A further feature of the invention relates to the formation of the neck of the article within a neck mold by such pressing operation applied to the hollow blank.

Other objects of the invention will appear hereinafter.

Referring to the accompanying drawings which illustrate a preferred form of machine embodying the present invention.

Fig. 2 is a sectional elevation on a somewhat larger scale of the suction gathering head or unit including the suction gathering blank mold, the plunger therein, and the piston motor for operating the plunger.

Fig. 3 is a similar view but with the plunger withdrawn from the mold and showing additionally the neck mold unit including the neck mold and press plunger brought into register with the blank mold.

Fig. 4 is a fragmentary sectional view showing the press plunger in its projected position.

Fig. 5 is a fragmentary view showing the blown article within the finishing mold.

Figure 1:
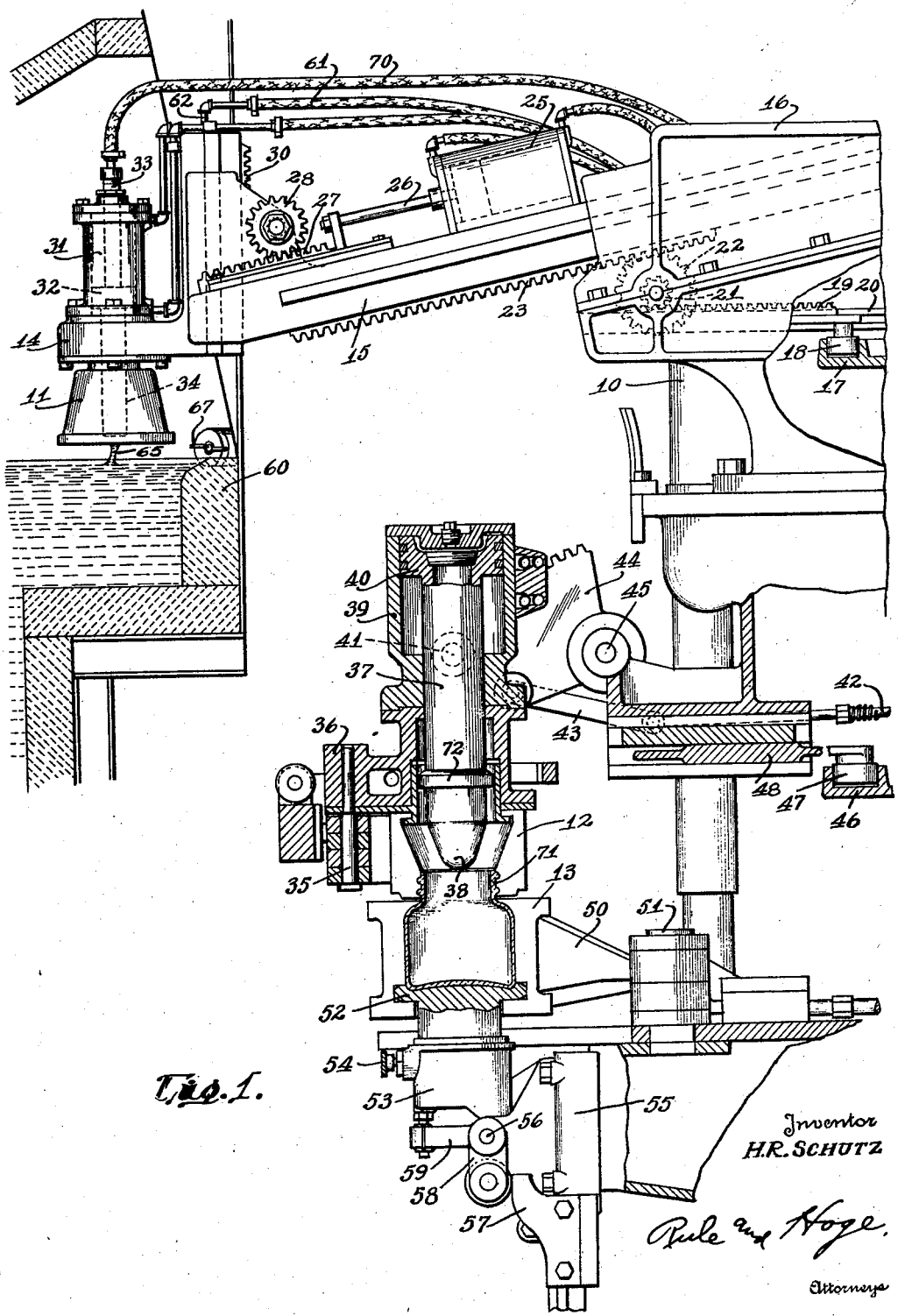
Fig. 1 is a part sectional elevation of the machine.

Referring particularly to Fig. 1, the machine comprises a mold carriage 10 which may be mounted for rotation about a vertical axis and driven continuously in a conventional manner. Mold groups or units which may be arranged in an annular series on the mold carriage, each comprises a suction gathering blank mold 11, a neck mold 12, and a finishing mold 13. The blank mold 11 is carried on a head 14 which in turn is supported on a ram 15, being mounted for vertical reciprocating movement on the ram. The ram is mounted for lengthwise reciprocating movement radially of the mold carriage in a frame 16 forming part of the carriage. The movements of the ram are under the control of a stationary cam track 17 in which runs a roll 18 carried by a rack 19 mounted to reciprocate in guideways 20. The rack 19 operates through gears 21, 22 and a rack 23 to reciprocate the ram 15.

The head 14 and mold 11 carried thereby, are reciprocated vertically by means of a piston motor 25 comprising a piston and piston rod 26 having operating connections with the head 14 through gearing including a rack bar 27, pinions 28 and 29 (Fig. 2) and rack bar 30. Mounted on the head 14 is a piston motor comprising a vertical cylinder 31, piston 32 and piston rod 33. A displacement device in the form of a tubular plunger 34 connected to the piston, projects downwardly through the head 14 and into the gathering mold 11. The purpose and operation of the plunger will be described hereinafter.

The neck mold unit comprises the partible neck mold 12, a press plunger 37, and its operating mechanism as presently described. The two halves of the neck hold are mounted to swing about a vertical pivot pin 35 secured in a head 36. The press plunger 37 is formed with a conical molding head or tip 38 and is supported in line with the neck mold. The plunger is actuated by a piston motor comprising a cylinder 39 secured to the head 36 and a piston 40 attached to the upper end of the plunger (Fig. 1). The neck mold unit is mounted on the mold carriage to swing about a pivot 41 for inverting and reinverting the neck mold plunger. These swinging movements may be under the control of a stationary cam having operating connection with the unit through a rod 42, link 43, and a gear segment 44 pivoted at 45 on the mold carriage.

Such mechanism for rotating the neck mold unit is conventional as shown, for example, in the patent to Cramer, No. 1,693,069, November 27, 1928, Glass forming machine, to which patent reference may be had for a more detailed disclosure. The opening and closing movements of the neck mold 12 are under the control of a stationary cam 46 on which runs a roll 47 connected to a slide 48 which in turn has operating connections with the neck mold through mechanism such as shown, for example, in said Cramer patent.

The finishing mold 13 comprises partible sections carried on arms 50 mounted to swing about a pivot pin 51 on the mold carriage for opening and closing the finishing mold. As shown in Fig. 1, the closed finishing mold is directly beneath and in register with the neck mold 12. The finishing mold bottom 52 is adjustably mounted on a carrier 53 and secured in adjusted position by clamping screw 54. The carrier 53 is supported on a vertically sliding frame 55 and mounted to tilt about an axis 56 on the frame 55. The tilting movement is controlled by a cam 57 operating through arms 58 and 59 which are secured to a pivot shaft 56 and swing about the axis of said shaft. The mold bottom support and tilting mechanism are also conventional as shown in said Cramer patent.

Referring to Figs. 1 and 2, each suction gathering mold 11 is brought by the rotation of the mold carriage over a pool of molten glass in the tank 60 and then lowered by the operation of the piston motor 25 into sealing contact with the pool. The plunger 34 is at this time in its lowermost position (Fig. 2) relative to the mold 11. When the mold is in sealing contact with the pool of glass, suction is applied within the mold and draws a charge of glass into the mold. The displacement device or plunger 34 serves to form a cavity within the glass blank in the mold, such cavity extending downward from the upper end of the blank and terminating above the bottom of the blank. A hollow blank is thus formed within the mold, the blank being open at its upper end and closed at the lower open end of the mold. The suction line includes a flexible hose 61 (Fig. 1) and pipe 62 (Fig. 2) communicating with channels 63 formed in the mold walls, said channels terminating in narrow slits 64 in the inner lower surface portions of the mold walls.

When the charge of glass has been drawn into the mold by suction, the mold is lifted away from the pool, the glass being held therein by suction while a constricted column or neck 65 of glass is formed. The constriction or necking in of the glass is increased by means of an annular groove 66 formed in the bottom surface of the mold. The neck 65 is severed by shears 67. The piston motor 31 then operates to withdraw the plunger 34 upwardly to the Fig. 3 position in which the lower end of the plunger is approximately in line with and forms a part of the upper wall surface of the mold cavity. The plunger and the motor piston and rod 33 are formed with a channel 68 extending lengthwise therethrough and terminating at the tip of the plunger in a slit 69. A suction pipe 70 is in communication with said channel. While the plunger is being withdrawn upwardly, suction is maintained therein and assists in causing the glass to be drawn to the hollow form shown in Fig. 3. Suction is also maintained in the suction line 61—64 to hold the glass in contact with the mold wall while the plunger is being withdrawn.

After the gathering mold with its charge of glass has passed beyond the tank, the neck mold unit is swung about its pivot from the depending position (Fig. 1) upwardly to the Fig. 3 position by which the neck mold 12 is brought directly beneath and in line with the gathering mold. The motor 25 then operates to lower the blank mold until it seats on the neck mold. The plunger 37 is then projected upwardly by its motor so that the forming head or tip 38 is projected into the mold cavity and thereby presses and molds the glass, conforming it to the shape of the plunger and also forcing a portion of the glass downwardly into the neck mold, thus forming the neck 71 of the molded article. An annular shoulder 72 or lip forming ring on the plunger, molds the lip or end surface of the article. After this molding operation, the plunger is withdrawn downwardly away from the molded parison, the blank mold is withdrawn upwardly, and the neck mold unit is swung downwardly about its axis 41, bringing the neck mold to a depending position with the bare parison suspended therefrom. The finishing mold 13 is then closed around the parison (Figs. 1 and 5) and the parison is blown and expanded within the finishing mold to its final shape. The means for controlling the application of suction within the molds, the means for controlling the blowing of the glass, and the means for controlling the operation of the several air motors may be conventional, as shown for example, in the above mentioned Cramer patent.

Modifications may be resorted to within the spirit and scope of my invention.

I claim:

1. A machine for forming hollow glass articles comprising, in combination, a blank mold formed with a mold cavity therein and open at its lower end, the mold being formed with an opening through its upper end wall into the mold cavity, said opening being of smaller diameter than the mold cavity, a plunger projecting downwardly through said opening into the mold cavity and spaced inwardly from the surrounding mold walls and having its lower end spaced above the bottom level of the mold, said plunger having a channel extending downwardly therethrough and terminating in an opening formed in the lower end of the plunger, means for drawing a charge of glass upwardly by suction into the mold and thereby filling the mold and enveloping the plunger in the glass, means for thereafter withdrawing the plunger upwardly relative to the mold, and means for maintaining suction through said channel during said withdrawal of the plunger and thereby reshaping the glass as the plunger is withdrawn to form a hollow blank open at its lower end.

2. A machine for forming hollow glass articles comprising a hollow blank mold open at one end to receive a charge of glass and having an opening of much smaller diameter than the mold cavity extending through the opposite end wall of the mold, a plunger projecting through said opening into the mold cavity and mounted for lengthwise reciprocating movement to a projected position in which the forward end thereof is adjacent to the plane of the said open end of the mold, and to a withdrawn position in which said end of the plunger is near said opening in the end wall of the mold, means for reciprocating said plunger and arresting it at said positions, the plunger and mold providing an annular unobstructed space within the mold cavity and surrounding the plunger when the latter is in its projected position, means for introducing a charge of molten glass into the mold through said open end while the plunger is in its projected position, and means for causing the glass to follow the plunger as the latter is withdrawn and thereby reshaping the charge of glass to form a hollow blank open at the said open end of the mold and closed at the opposite end of the mold.

3. A machine for forming hollow glass articles comprising a hollow blank mold providing a mold cavity, the mold being open at one end and having an opening of smaller diameter than the mold cavity extending through the opposite end wall of the mold, a plunger projecting through said opening into the mold cavity and spaced from the surrounding side walls of the mold cavity, means for introducing a charge of molten glass into the mold through said open end thereof and causing the glass to fill the space between the plunger and said surrounding walls, means for thereafter withdrawing the plunger to a position in which its projected end is about flush with said opposite end wall, and means for causing the molten glass to follow the plunger while the latter is being withdrawn and thereby reshaping the charge of glass to the form of a hollow blank open at the said open end of the mold and closed at the opposite end of the mold.

4. The combination of a hollow suction gathering mold open at its lower end, a mold carrying head, said mold being mounted on the underside of said head, a piston motor mounted on the upper side of said head in vertical alignment with the mold, said motor including a vertically reciprocating piston, a plunger attached to said piston for up and down movement therewith, said head and the upper wall of the mold having an opening therethrough in alignment with the motor and through which said plunger projects downwardly into the mold cavity, said plunger being of substantially smaller diameter than the mold cavity and when in its lowered position defining with the side walls of the mold an unobstructed annular space to receive a charge of molten glass, the lower end of the plunger when in its lowered position being near the level of the mouth of the mold and when at the upper limit of its movement being near the upper wall of the mold cavity and forming a part thereof, the plunger being formed with a channel extending therethrough to the lower end thereof, and means for applying suction through said channel for causing a portion of a charge of glass to follow the plunger when the latter is moved upwardly and thereby reshape the glass within the mold.

5. A machine for forming hollow glass articles comprising a blank mold with a mold cavity therein, the mold being open at one end and having an opening extending through the opposite end wall thereof, a plunger of smaller diameter than the mold cavity projecting through said opening into the mold cavity with an annular space between the plunger and the surrounding walls of the mold cavity, means for introducing a charge of molten glass into the mold cavity through said open end thereof, means for thereafter withdrawing the plunger, said plunger having a channel extending therethrough, means providing channels extending to the inner surfaces of the side walls of the mold, means for applying suction through the plunger channel and the other said channels while the plunger is being withdrawn and thereby causing the molten glass to follow the plunger and also causing suction to be applied at said inner surfaces while the plunger is being withdrawn, whereby the glass is reshaped during the withdrawal of the plunger to form a hollow blank open at the said open end of the mold.

HAROLD R. SCHUTZ.

REFERENCES CITED

The following references are of record in the file of this patent:

UNITED STATES PATENTS

| Number    | Name    | Date          |
|-----------|---------|---------------|
| 1,223,393 | Kadow   | Apr. 24, 1917 |
| 1,693,069 | Cramer  | Nov. 27, 1928 |
| 1,764,360 | Soubier | June 17, 1930 |
| 1,856,518 | Soubier | May 3, 1932   |
| 1,875,827 | Soubier | Sept. 6, 1932 |
| 1,904,985 | Cramer  | Apr. 18, 1933 |
| 1,931,336 | Van Ness| Oct. 17, 1933 |
| 2,016,361 | Cramer  | Oct. 8, 1935  |
| 2,226,504 | Rowe    | Dec. 24, 1940 |